United States Patent
Jiang et al.

(10) Patent No.: US 10,237,037 B2
(45) Date of Patent: Mar. 19, 2019

(54) PILOT RECONFIGURATION AND RETRANSMISSION IN WIRELESS NETWORKS

(71) Applicant: QUALCOMM Incorporated, San Diego, CA (US)

(72) Inventors: Jing Jiang, San Diego, CA (US); Joseph Binamira Soriaga, San Diego, CA (US); Tingfang Ji, San Diego, CA (US); Naga Bhushan, San Diego, CA (US); Krishna Kiran Mukkavilli, San Diego, CA (US); Peter Gaal, San Diego, CA (US); John Edward Smee, San Diego, CA (US)

(73) Assignee: QUALOCMM Incorporated, San Diego, CA (US)

( * ) Notice: Subject to any disclaimer, the term of this patent is extended or adjusted under 35 U.S.C. 154(b) by 0 days.

(21) Appl. No.: 15/947,489

(22) Filed: Apr. 6, 2018

(65) Prior Publication Data
US 2018/0234222 A1    Aug. 16, 2018

Related U.S. Application Data

(62) Division of application No. 14/829,060, filed on Aug. 18, 2015, now Pat. No. 9,967,070.
(Continued)

(51) Int. Cl.
*H04L 5/00* (2006.01)
*H04B 17/309* (2015.01)

(52) U.S. Cl.
CPC ......... *H04L 5/0048* (2013.01); *H04B 17/309* (2015.01); *H04L 5/006* (2013.01); *H04L 5/0007* (2013.01); *H04L 5/0096* (2013.01)

(58) Field of Classification Search
None
See application file for complete search history.

(56) References Cited

U.S. PATENT DOCUMENTS 8,238,931 B1 * 8/2012 Sarkar .................. H04W 48/08
                                                                         455/453
9,461,859 B2    10/2016 Gorokhov et al.
(Continued)

FOREIGN PATENT DOCUMENTS

JP    2007514352 A    5/2007
WO   WO-2005060298 A1    6/2005
(Continued)

OTHER PUBLICATIONS

Partial International Search Report—PCT/US2015/054045—ISA/EPO—dated Jan. 26, 2016.
(Continued)

*Primary Examiner* — Otis L Thompson, Jr.
(74) *Attorney, Agent, or Firm* — Haynes and Boone, LLP

(57) ABSTRACT

Adaptive pilot signaling is disclosed in which resources allocated to pilot symbols are allowed to vary to more closely match channel conditions. User equipments (UEs) may request different pilot configurations depending on channel conditions. In one embodiment, a method includes receiving a first set of pilot symbols using a first number of resource elements during a first transmission time interval (TTI), and receiving a second set of pilot symbols using a second number of resource elements during a second TTI. In the embodiment, the first TTI and the second TTI include the same number of resource elements, and the first number of resource elements is different than the second number of resource elements.

20 Claims, 10 Drawing Sheets

Related U.S. Application Data

(60) Provisional application No. 62/073,656, filed on Oct. 31, 2014.

(56) References Cited

U.S. PATENT DOCUMENTS

| | | | |
|---|---|---|---|
| 9,967,070 B2 | 5/2018 | Jiang et al. | |
| 2003/0133493 A1* | 7/2003 | Suzuki | H04B 1/7113 375/130 |
| 2004/0132494 A1* | 7/2004 | Tirkkonen | H04W 52/325 455/562.1 |
| 2005/0281217 A1* | 12/2005 | Mottier | H04B 7/2656 370/328 |
| 2008/0107192 A1* | 5/2008 | Mukkavilli | H04L 5/0048 375/260 |
| 2009/0046787 A1* | 2/2009 | Uesugi | H04L 5/0007 375/260 |
| 2009/0245197 A1 | 10/2009 | Ma et al. | |
| 2009/0279623 A1* | 11/2009 | Wu | H04L 5/0023 375/260 |
| 2010/0091724 A1 | 4/2010 | Ishii et al. | |
| 2010/0246527 A1 | 9/2010 | Montojo et al. | |
| 2010/0316152 A1* | 12/2010 | Joko | H04L 1/0003 375/260 |
| 2011/0075625 A1 | 3/2011 | Nystroem et al. | |
| 2012/0188946 A1* | 7/2012 | Ma | H04B 7/2621 370/328 |
| 2012/0236909 A1* | 9/2012 | Ma | H04B 7/0413 375/146 |
| 2013/0003668 A1 | 1/2013 | Xiao et al. | |
| 2013/0301761 A1 | 11/2013 | Ma et al. | |
| 2014/0119314 A1* | 5/2014 | Pajukoski | H04L 5/0051 370/329 |
| 2014/0192688 A1 | 7/2014 | Yang et al. | |
| 2014/0269520 A1 | 9/2014 | Yi et al. | |
| 2014/0301356 A1 | 10/2014 | Wang | |
| 2014/0362832 A1 | 12/2014 | Rudolf et al. | |
| 2015/0010097 A1 | 1/2015 | Ma et al. | |
| 2015/0282123 A1 | 10/2015 | Miao et al. | |
| 2016/0020891 A1* | 1/2016 | Jung | H04W 72/0446 370/280 |
| 2016/0073357 A1* | 3/2016 | Baker | H04W 52/325 455/522 |
| 2016/0127093 A1* | 5/2016 | Jiang | H04L 5/0051 370/330 |
| 2016/0127922 A1 | 5/2016 | Krishnamoorthy et al. | |
| 2016/0143030 A1* | 5/2016 | Lee | H04L 5/0051 370/329 |
| 2016/0234857 A1* | 8/2016 | Chen | H04W 72/1231 |
| 2018/0063858 A1* | 3/2018 | Au | H04W 16/14 |
| 2018/0063865 A1* | 3/2018 | Islam | H04W 76/27 |

FOREIGN PATENT DOCUMENTS

| | | |
|---|---|---|
| WO | WO-2007051190 A1 | 5/2007 |
| WO | WO-2014139435 A1 | 9/2014 |

OTHER PUBLICATIONS

International Search Report and Written Opinion—PCT/US2015/054045—ISA/EPO—dated Apr. 5, 2016.

* cited by examiner

PILOT RECONFIGURATION AND RETRANSMISSION IN WIRELESS NETWORKS

CROSS-REFERENCE TO RELATED APPLICATION

The present application is a divisional application of U.S. patent application Ser. No. 14/829,060, filed Aug. 18, 2015, which claims priority to and the benefit of U.S. Provisional Patent Application No. 62/073,656, filed Oct. 31, 2014, each of which is hereby incorporated by reference in its entirety

TECHNICAL FIELD

This application relates to wireless communication systems, and more particularly to adaptive pilot signaling and flexible frame formats and network protocols for accommodating changes in pilot signal structure and/or scheduling of pilot transmissions.

BACKGROUND

To achieve sufficient performance in wireless communication systems, it is sometimes useful to characterize the wireless channel. For example, a transmitting entity may need an estimate of one or more channel parameters to perform spatial processing, precoding, or adaptive modulation and coding in order to transmit data to a receiving entity. The receiving entity may need an estimate of one or more channel parameters to properly demodulate transmitted signals in order to recover transmitted data.

Pilots may be inserted in a transmitted data stream to assist a receiving entity with various functions, including not only channel estimation but also timing and frequency offset acquisition as examples. A pilot typically includes one or more modulation symbols known to both the transmitting entity and the receiving entity that are transmitted in a known manner Since a pilot represents overhead in a system, it is desirable to minimize the amount of system resources used to transmit pilots.

Conventional systems employ a fixed pilot structure that provides an adequate number and distribution of pilot symbols for most receiving entities under most channel conditions. However, the pilot structures may be inadequate for challenging channel conditions, and the pilot structures may waste system resources during more benign channel conditions. Thus, there is a need for techniques to better match pilot structures to channel conditions.

SUMMARY

In one aspect of the disclosure, a method includes receiving a first set of pilot symbols using a first number of resource elements during a first transmission time interval (TTI), and receiving a second set of pilot symbols using a second number of resource elements during a second TTI, wherein the first TTI and the second TTI include the same number of resource elements, and wherein the first number of resource elements is different than the second number of resource elements.

In an additional aspect of the disclosure, a method includes transmitting a first set of pilot symbols using a first number of resource elements during a first TTI, and transmitting a second set of pilot symbols using a second number of resource elements during a second TTI, wherein the first TTI and the second TTI include the same number of resource elements, and wherein the first number of resource elements is different than the second number of resource elements.

In an additional aspect of the disclosure, a method includes determining that low-latency data is available to transmit during a first TTI, informing a mobile station that the low-latency data will be transmitted during a first time slot reserved for a pilot symbol in the first TTI, transmitting the low-latency data during the first time slot, and transmitting the pilot symbol during a second time slot.

In an additional aspect of the disclosure, a method includes receiving a scheduling message indicating that low-latency data is scheduled to be transmitted during a first time slot reserved for a pilot symbol in a first TTI, receiving the low-latency data during the first time slot, and receiving the pilot symbol during a second time slot.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G)) network.

This disclosure relates generally to adaptive pilot signaling and flexible frame formats and network protocols for accommodating changes in pilot signal structure and/or scheduling. Adaptive techniques are disclosed herein that attempt to tune a number of pilot symbols and the distribution thereof over time and frequency resources to channel conditions in an effort to minimize system overhead while at the same time providing enough pilot symbols for receivers to function sufficiently.

Figure 1:
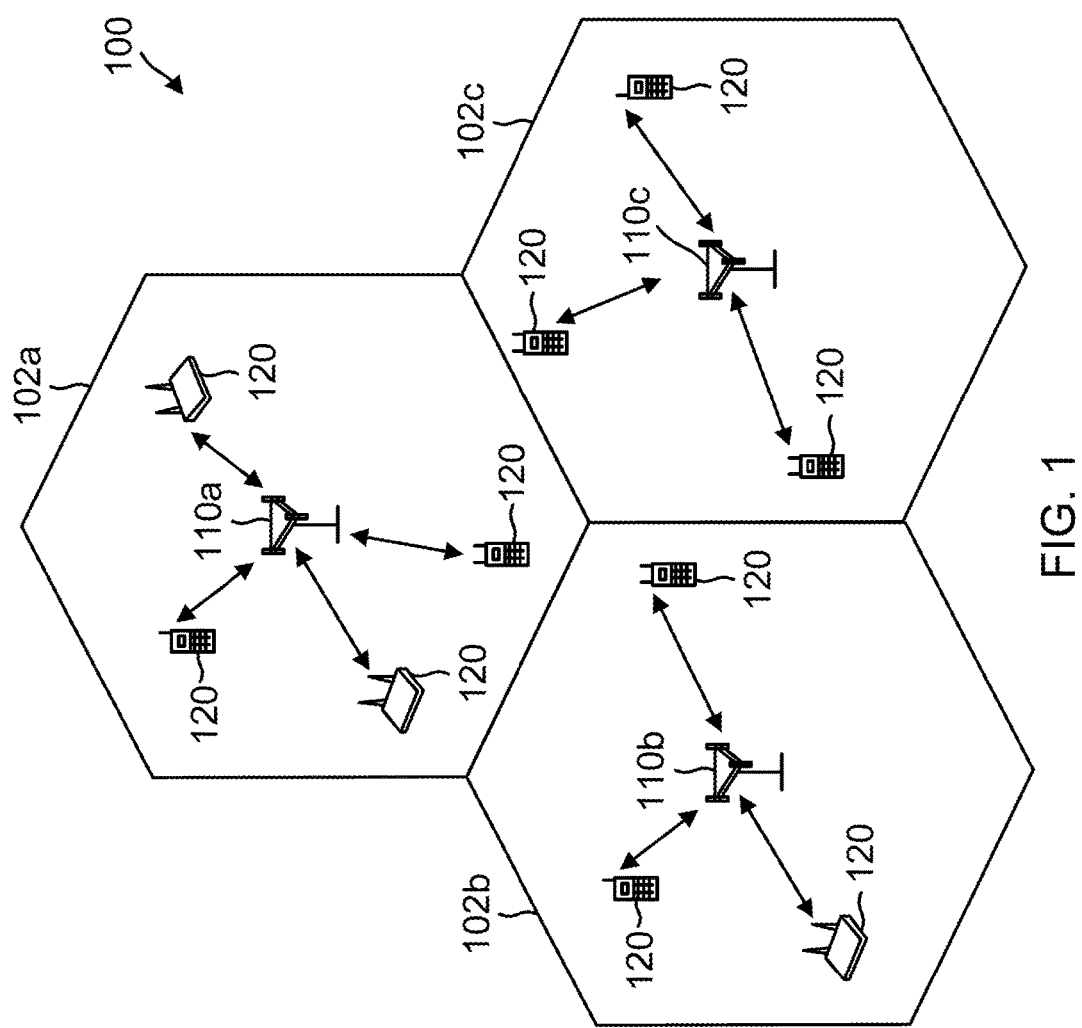
FIG. 1 illustrates a wireless communication network in accordance with various aspects of the present disclosure.

FIG. 1 illustrates a wireless communication network 100, in accordance with various aspects of the disclosure. The wireless network 100 may include a number of base stations 110. A base station 110 may include an evolved Node B (eNodeB) in the LTE context, for example. A base station may also be referred to as a base transceiver station or an access point.

The base stations 110 communicate with user equipments (UEs) 120 as shown. A UE 120 may communicate with a base station 110 via an uplink and a downlink. The downlink (or forward link) refers to the communication link from a base station 110 to a UE 120. The uplink (or reverse link) refers to the communication link from a UE 120 to a base station 110.

The UEs 120 may be dispersed throughout the wireless network 100, and each UE 120 may be stationary or mobile. A UE may also be referred to as a terminal, a mobile station, a subscriber unit, etc. A UE 120 may be a cellular phone, a smartphone, a personal digital assistant, a wireless modem, a laptop computer, a tablet computer, etc. The wireless communication network 100 is one example of a network to which various aspects of the disclosure apply.

This disclosure is directed to any type of modulation scheme, but orthogonal frequency division multiplexing (OFDM) is used as a representative modulation. OFDM is a multi-carrier modulation technique that effectively partitions the overall system bandwidth into multiple (K) orthogonal frequency subbands. These subbands may also be referred to as tones, subcarriers, bins, and frequency channels. With OFDM, each subband is associated with a respective subcarrier that may be modulated with data. Up to K modulation symbols may be sent on the K subbands in each OFDM symbol period.

A pilot symbol may be a symbol known to both the transmitter and receiver and transmitted in a subband. For an OFDM symbol with K subbands, any number and configuration of subbands may be used for pilot symbols. For example, half of the subbands may be used for pilot symbols, and the remaining subbands may be used for other purposes, such as to transmit data symbols or control symbols or the remaining subbands may not be used at all.

The pilot transmission and signaling techniques described herein may be used for a single-input single-output (SISO) system, a single-input multiple-output (SIMO) system, a multiple-input single-output (MISO) system, and a multiple-input multiple-output (MIMO) system. These techniques may be used for an OFDM-based system and for other multi-carrier communication systems. These techniques may also be used with various OFDM subband structures.

Figure 2:
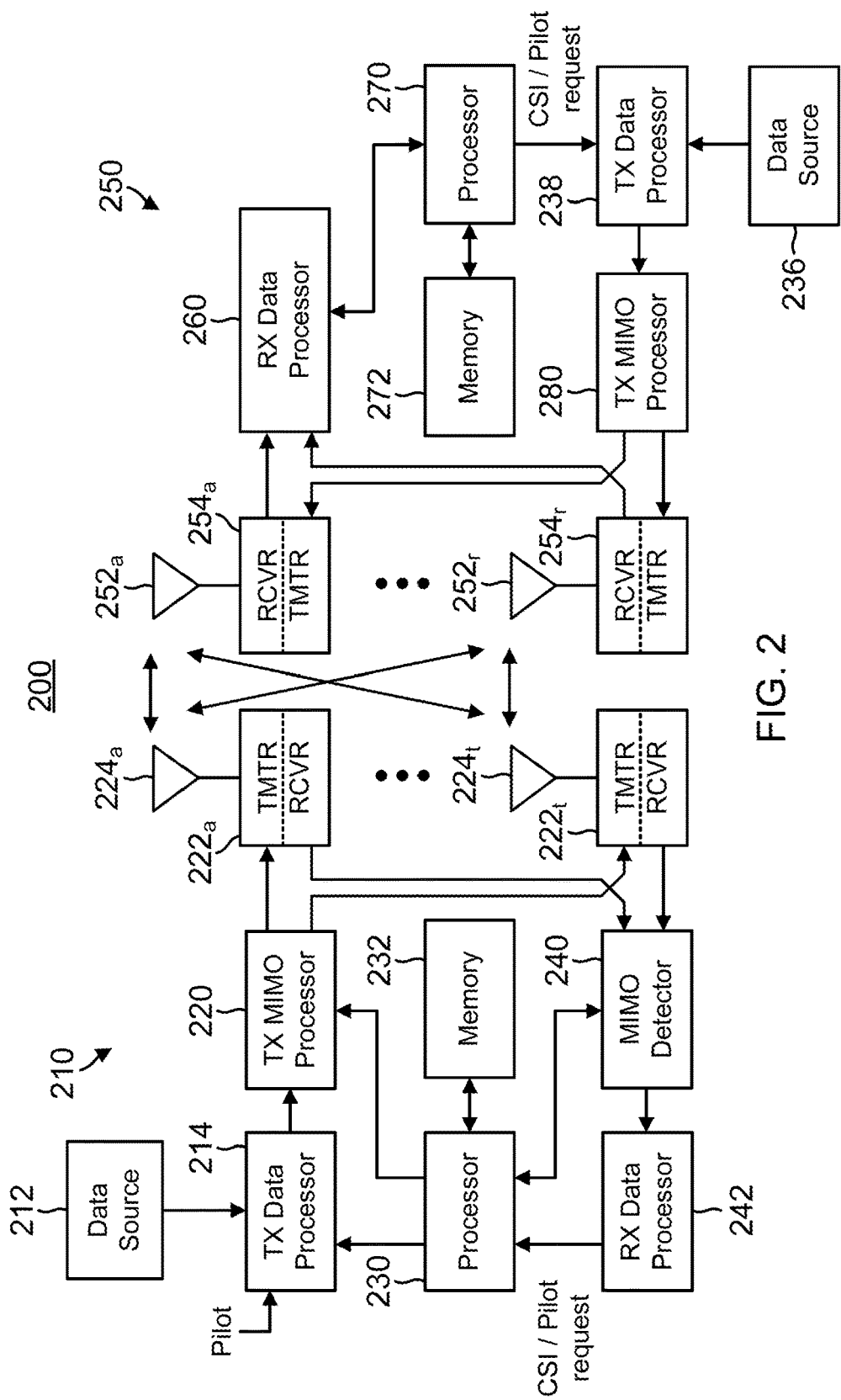
FIG. 2 is a block diagram illustrating an exemplary transmitter system in accordance with various aspects of the present disclosure.

FIG. 2 is a block diagram illustrating an exemplary transmitter system 210 (e.g., a base station 110) and a receiver system 250 (e.g., a UE 120) in a MIMO system 200, according to certain aspects of the present disclosure. At the transmitter system 210, traffic data for a number of data streams is provided from a data source 212 to a transmit (TX) data processor 214.

In a downlink transmission, for example, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response or other channel parameters. Pilot data may be formatted into pilot symbols. The number of pilot symbols and placement of pilot symbols within an OFDM symbol may be determined by instructions performed by processor 230.

The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230. The number of pilot symbols and placement of the pilot symbols in each frame may also be determined by instructions performed by processor 230.

The processor 230 may be implemented using a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. The processor 230 may also be implemented as a combination of computing devices, e.g., a combination of a DSP and a microprocessor, a plurality of microprocessors, one or more microprocessors in conjunction with a DSP core, or any other such configuration.

The transmitter system 210 further includes a memory 232. The memory 232 may be any electronic component capable of storing information and/or instructions. For example, the memory 250 may include random access memory (RAM), read-only memory (ROM), flash memory devices in RAM, optical storage media, erasable programmable read-only memory (EPROM), registers, or combinations thereof. In an embodiment, the memory 232 includes a non-transitory computer-readable medium.

Instructions or code may be stored in the memory 232 that are executable by the processor 230. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The modulation symbols for all data streams are then provided to a TX MIMO processor 220, that may further process the modulation symbols (e.g., for OFDM). TX MIMO processor 220 then provides $N_T$ modulation symbol streams to $N_T$ transmitters (TMTR) $222_a$ through $222_t$. In some embodiments, TX MIMO processor 220 applies beamforming weights to the symbols of the data streams and to the antenna from which the symbol is being transmitted. The transmitter system 210 includes embodiments having only one antenna or having multiple antennas.

Each transmitter 222 receives and processes a respective symbol stream to provide one or more analog signals, and further conditions (e.g., amplifies, filters, and upconverts) the analog signals to provide a modulated signal suitable for transmission over the MIMO channel $N_T$ modulated signals from transmitters 222a through 222t are then transmitted from $N_T$ antennas $224_a$ through $224_t$, respectively. The techniques described herein apply also to systems with only one transmit antenna. Transmission using one antenna is simpler than the multi-antenna scenario. For example, there may be no need for TX MIMO processor 220 in a single antenna scenario.

At receiver system 250, the transmitted modulated signals are received by $N_R$ antennas $252_a$ through $252_r$, and the received signal from each antenna 252 is provided to a respective receiver (RCVR) $254_a$ through $254_r$. Each receiver 254 conditions (e.g., filters, amplifies, and downconverts) a respective received signal, digitizes the conditioned signal to provide samples, and further processes the samples to provide a corresponding "received" symbol stream. The techniques described herein also apply to embodiments of receiver system 250 having only one antenna 252.

An RX data processor 260 then receives and processes the $N_R$ received symbol streams from NR receivers 254 based on a particular receiver processing technique to provide $N_T$ detected symbol streams. The RX data processor 260 then demodulates, deinterleaves, and decodes as necessary each detected symbol stream to recover the traffic data for the data stream. The processing by RX data processor 260 is complementary to that performed by TX MIMO processor 220 and TX data processor 214 at transmitter system 210.

Information provided by the RX data processor 260 allows the processor 270 to generate reports such as channel state information (CSI) and/or a pilot request to provide to the TX Data Processor 238. Processor 270 formulates a reverse link message comprising the CSI and/or pilot request to transmit to the transmitter system.

The processor 270 may be implemented using a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. The processor 270 may also be implemented as a combination of computing devices, e.g., a combination of a DSP and a microprocessor, a plurality of microprocessors, one or more microprocessors in conjunction with a DSP core, or any other such configuration.

The reverse link message may comprise various types of information regarding the communication link and/or the received data stream. The reverse link message is then processed by a TX data processor 238, which also receives traffic data for a number of data streams from a data source 236, modulated by a TX MIMO processor 280, conditioned by transmitters $254_a$ through $254_r$, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reverse link message transmitted by the receiver system 250. Processor 230 then determines pilot symbol density and placement based on information in the reverse link message. One example of pilot symbol density is number of pilot symbols per unit time or per unit frequency as discussed more fully below. An example pilot structure is a combination of pilot density and placement.

Figure 3A:
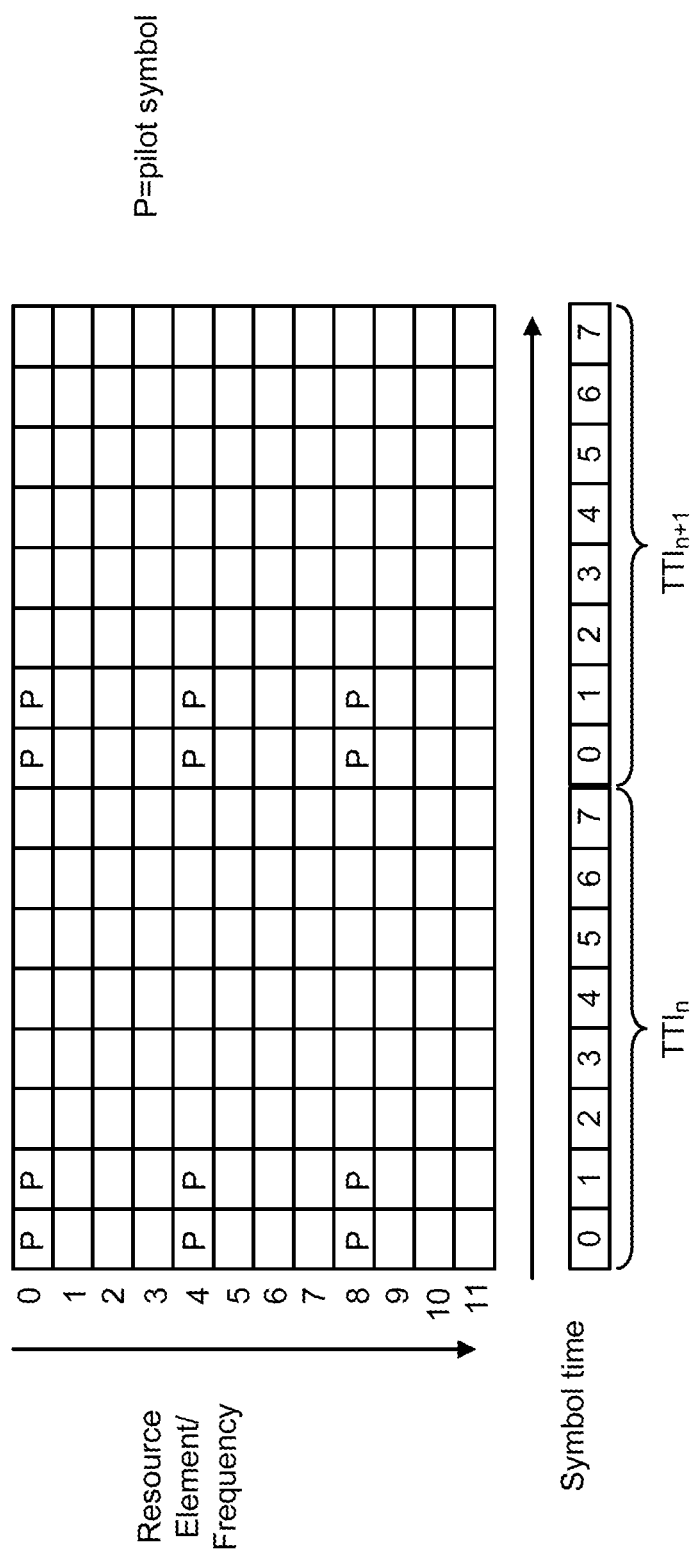
FIGS. 3A-3C illustrate downlink frame structures used in a wireless communication network in accordance with various aspects of the present disclosure.
Figure 3B:
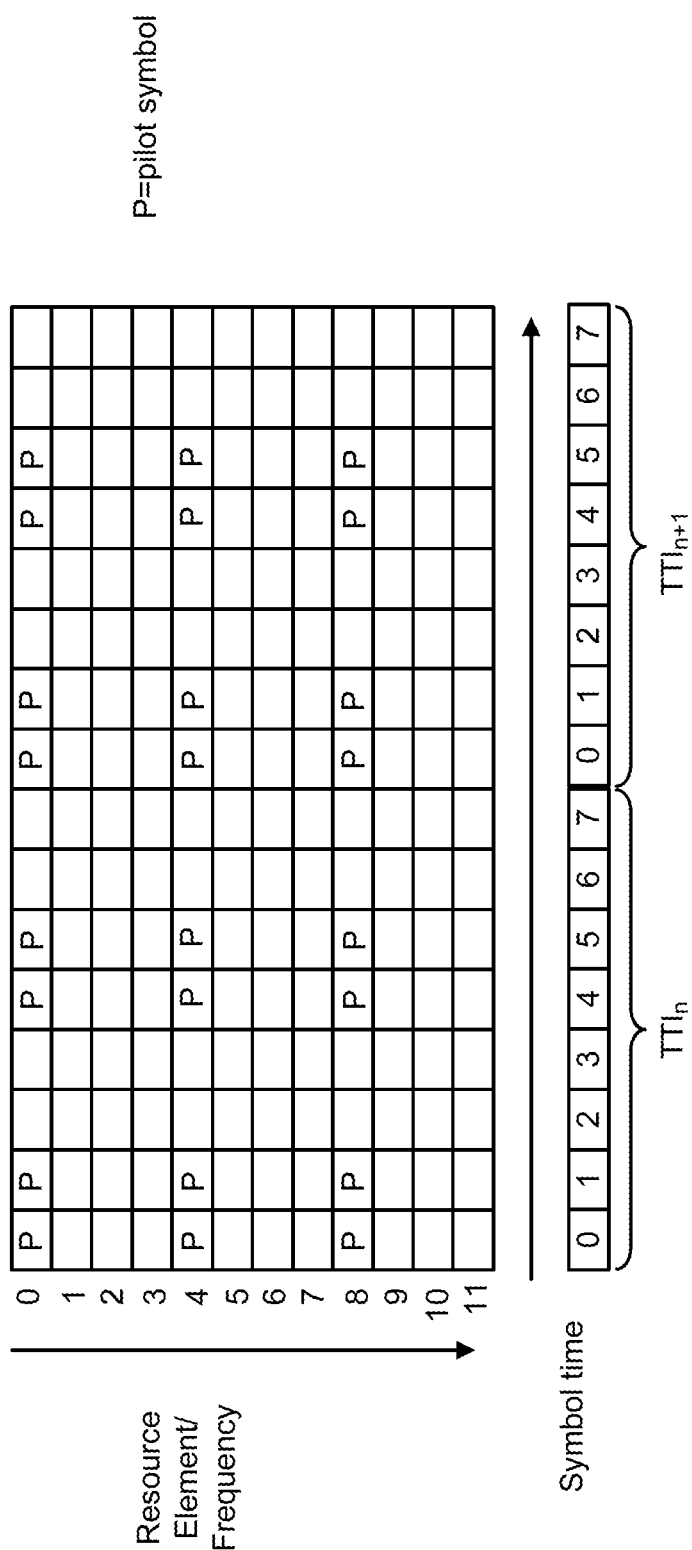
Figure 3C:
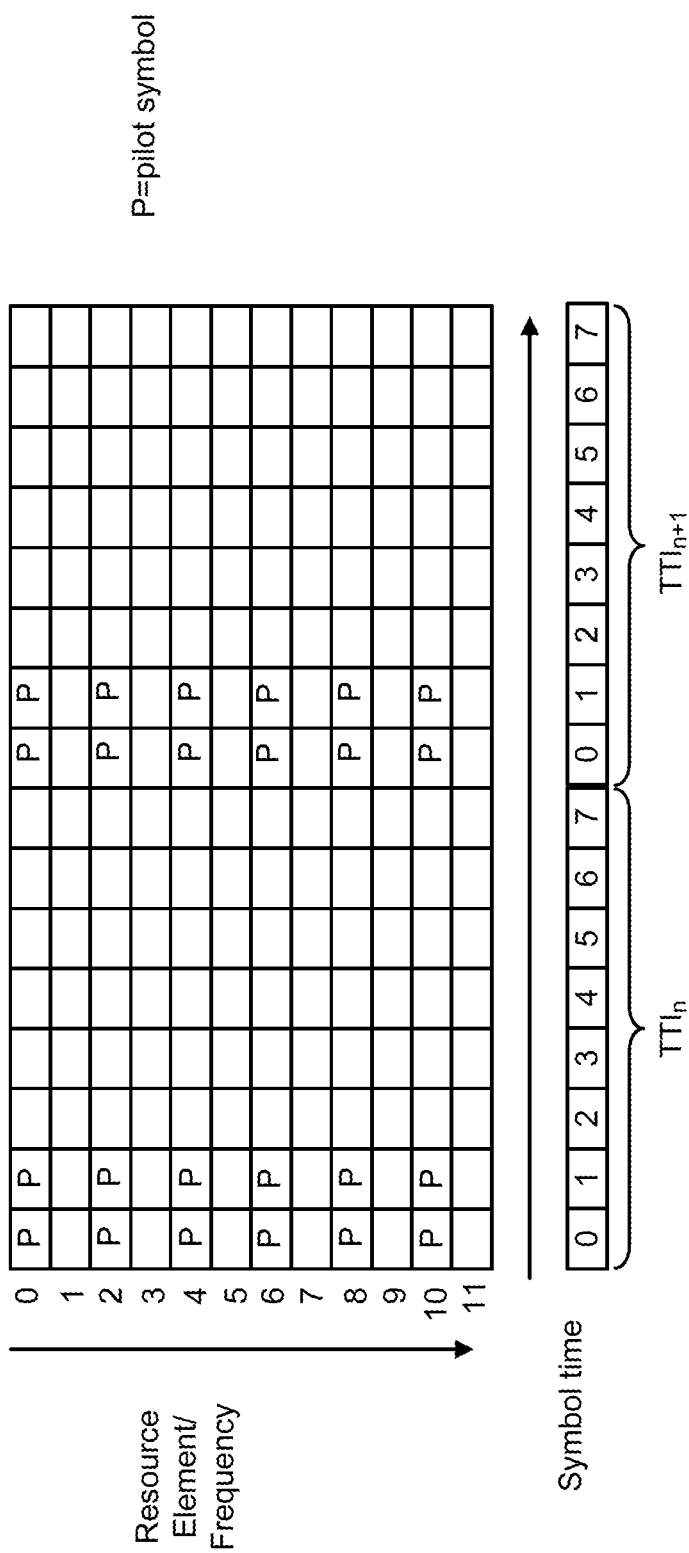

FIGS. 3A-3C illustrate downlink frame structures used in a wireless communication network (e.g., the wireless communication network shown in FIG. 1), in accordance with various aspects of the present disclosure. The transmission timeline for the downlink may be partitioned into units of transmission time intervals (TTIs). A TTI may be related to the size of the data blocks passed from the higher network layers to the radio link layer. In some embodiments, the duration of symbols, such as OFDM symbols, is fixed, and there are a predetermined number of symbol periods during each TTI. For example, each TTI may be any number of symbol periods, such as 8, 10, or 12 symbol periods, as examples. In the embodiments in FIGS. 3A-3C, each TTI includes eight OFDM symbol periods, and the symbol periods are assigned indices 0 through 7 as shown. A transmission during a TTI may be referred to as a frame, a subframe, or a data block. An OFDM symbol period is an example time slot.

A number of resource elements may be available in each OFDM symbol period. Each resource element may cover one subcarrier in one symbol period and may be used to send one modulation symbol, which may be a real or complex value.

FIGS. 3A-3C illustrate three examples of signals transmitted using the illustrated frame structures. In particular, the examples in FIGS. 3A-3C illustrate various pilot structures. In each of FIGS. 3A-3C, there are 11 resource elements per OFDM symbol as an illustrative example. The resource elements are assigned indices 0 through 11 as shown. Pilot symbols are transmitted in the designated resource elements and are denoted by "P." The remaining resource elements are available for other types of symbols, such as data symbols, or control symbols, or are simply unused or muted.

The pilot structures in FIGS. 3A-3C may represent a signal format transmitted from an antenna. The pilot structures may apply regardless of the number of antennas employed in the transmitting entity or the receiving entity. For example, in a SISO system, the signal is transmitted from the transmitting antenna and received at the receive antenna. As another example, in a MIMO system, the illustrated frame structures are transmitted from at least one antenna. Each antenna from among a plurality of antennas may transmit the same or a different pilot structure. In one embodiment, the illustrated pilot structure will be received by a receive antenna, and may be part of a composite signal that is a sum of signals from a plurality of antennas.

FIG. 3A illustrates a baseline pilot structure. Pilot symbols are transmitted in OFDM symbol periods 0 and 1 in each TTI. Within periods 0 and 1, pilot symbols are transmitted in resource elements 0, 4 and 8. In some embodiments, the pilot symbols may be transmitted to a specific UE. In other embodiments, the pilot symbols may be transmitted to a group of UEs. In some other embodiments, the pilot symbols may be cell-specific reference signals. The pilots symbols may be used for channel estimation for coherent demodulation of the physical channel.

FIG. 3B illustrates one technique to double the pilot density as compared to FIG. 3A. In FIG. 3B, the pilot density is doubled by doubling the number of OFDM symbols within a TTI that contains pilot symbols. More specifically, pilot symbols are transmitted in the $4^{th}$ and $5^{th}$ periods within a TTI, in addition to the $0^{th}$ and $1^{st}$ periods. In essence, the number of pilot symbols is doubled by increasing the duty cycle or time density of pilot symbols. FIG. 3B represents but one example of many ways to double the duty cycle. For example, pilot symbols could be transmitted instead in the $1^{st}$ through $4^{th}$ symbol positions or any other combination of four symbol positions.

FIG. 3C illustrates another technique to double the pilot density as compared to FIG. 3A. In FIG. 3C, the pilot density is doubled by doubling the frequency occupancy as compared to FIG. 3A. More specifically, there are pilot symbols in resource elements 0, 2, 4, 6, 8, and 10 in the $0^{th}$ and $1^{st}$ OFDM symbol periods in each TTI. In essence, the number of pilot symbols is doubled by increasing the density versus frequency within the symbol positions. FIG. 3C represents but one example of many ways to double the frequency density as compared to FIG. 3A. For example, pilot symbols could be transmitted in the $1^{st}$ through $6^{th}$ resource elements or any other combination of six resource elements.

There are situations in which it would be advantageous to vary the frequency density of pilots as opposed to time density of pilots and vice versa. FIG. 3A represents a pilot structure that is advantageous for channels with relatively low Doppler spread and relatively low channel delay-spread. Time variation of a channel is related to Doppler spread of the channel. Doppler spread may be caused, for example, by the differences in Doppler shifts of different components of a signal, if either the transmitter or receiver is in motion. As Doppler spread increases, it is advantageous to increase the time density of pilot symbols. One reason is because the higher the Doppler spread the faster a channel estimate becomes outdated. Increasing time density or duty cycle of pilot symbols allows a channel estimate to be updated more frequently, which is beneficial for higher delay spreads.

Frequency variation of a channel is related to delay spread of the channel. As delay spread increases, it is advantageous to increase the frequency density of pilot symbols. This is because increases in delay spread result in increases in frequency selectivity of a channel Increasing frequency density of pilot symbols allows channel estimates to better capture frequency selectivity caused by increased delay spread.

It may also be advantageous to vary pilot density on the basis of other parameters, such as signal-to-noise ratio (SNR) estimates, signal-to-interference-plus-noise (SINR) estimates, or interference estimates. For example, for increasing noise or interference values (or decreasing SNR or SINR), increasing numbers of pilot symbols are useful.

Techniques can be used to estimate Doppler spread, delay spread, SNR, SINR, and interference in UEs. Any one of these techniques can be used to estimate these channel parameters, and these channel parameters are examples of CSI. One or more of these parameters can be used to select a downlink pilot structure. The selection of pilot structure can be made either in the UE or the base station. If the decision is to be made in the base station, channel parameter estimates can be fed back to the base station to allow the base station to make the decision on pilot structure. If the decision on pilot structure is to be made in the UE, a request for the determined pilot structure can be transmitted to the base station.

Figure 4:
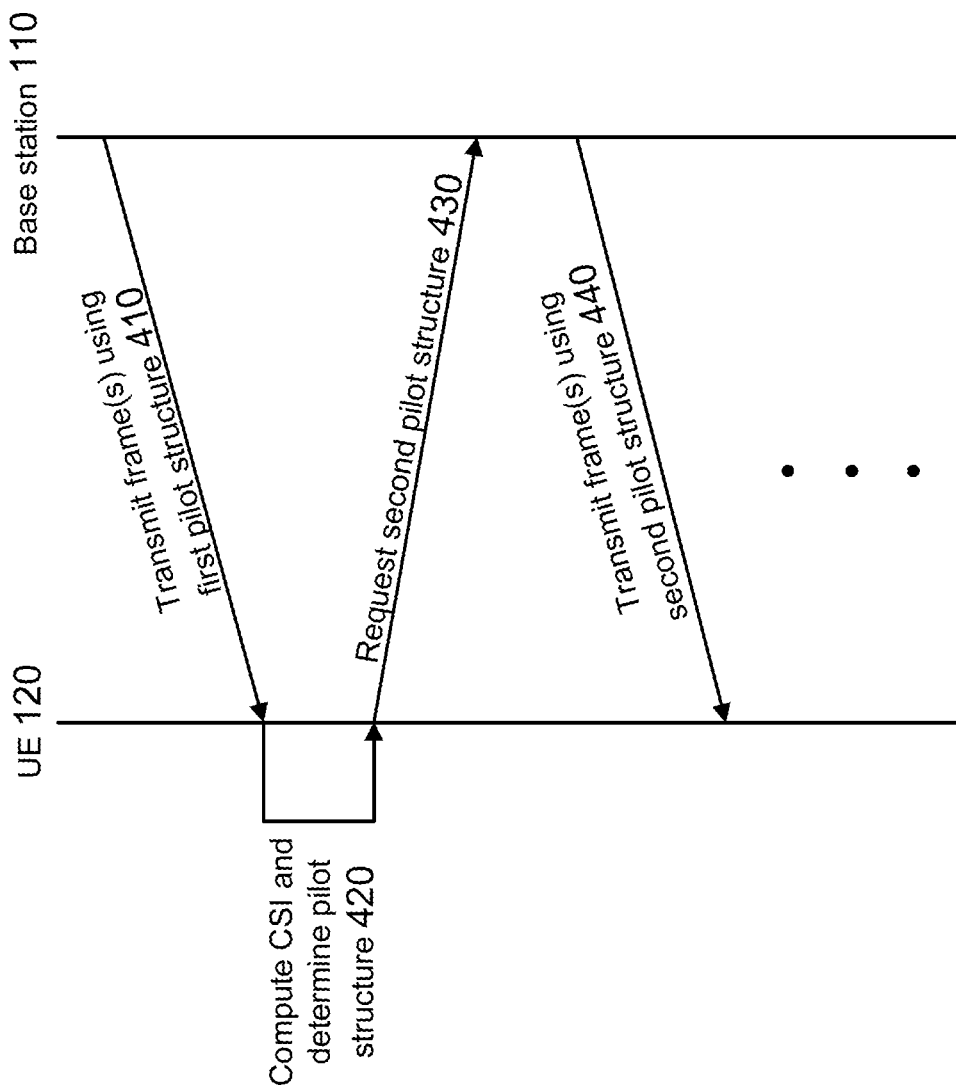
FIG. 4 is a protocol diagram illustrating some signaling aspects between a base station and a UE for supporting pilot signals of various densities in accordance with various aspects of the present disclosure.

FIG. 4 is a protocol diagram illustrating some signaling aspects between a base station 110 and a UE 120 for supporting pilot signals of various densities in accordance with the present disclosure. In action 410, one or more frames are transmitted using a first pilot structure. The pilot structure may include any number of pilot symbols in any pattern. For example, the pilot structure may be any of the pilot structures illustrated in FIGS. 3A-3C. In action 420, the UE 120 receives the frames and computes CSI based at least in part on the received frames. The CSI may include any of a number of the parameters discussed earlier, such as Doppler spread and delay spread. The CSI may incorporate historical CSI data based on past frames, so the CSI may be based on more than just the most recently transmitted frame or frames.

Based on the computed CSI, the UE determines a pilot structure to be used for future transmissions. The pilot structure may be based on a table lookup, for example, in which one or more channel parameter values are used as indexes in a table to lookup a predetermined pilot structure. For example, there may be a number of available and predetermined pilot structures known to both transmitter and receiver, each with an assigned index, such as 1 through n. The UE may select from among the list of pilot structures and send the index associated with the selected pilot structure to a base station. Each element in the table may correspond to measurements of various CSI parameters being between various thresholds. For example, an entry in the table may correspond to the scenario in which estimated delay spread is between two values or thresholds and in which estimated Doppler spread is between another two values or thresholds.

As an alternative, the UE 120 may make a determination that it either desires an increase, a decrease, or no change in pilot symbol density. If it is determined that an increase or decrease is desired, the UE 120 further determines for the density to be increased/decreased versus time or versus frequency. There may be only a fixed and predetermined number of options for pilot density in the system (e.g., the n predetermined pilot structures described previously), and an increase implies that the next highest pilot density from among the available densities is desired. Similarly, a decrease implies that the next lowest pilot density from among the available densities is desired.

In action 430, based on the computed CSI, the UE sends a request to the base station indicating its determination. In action 440, the base station 110 next transmits one or more frames using the requested second pilot structure. The process 420-440 may then repeat as long as there is data available for transmission.

As an alternative to the embodiment in FIG. 4, the base station 110 may determine when and whether to change the pilot structure. For example, the transmission in action 430 may not take place, and instead the UE 120 may feedback information to the base station 110 such as a channel quality indicator (CQI), a modulation and coding scheme (MCS) selection, or other CSI. For example, an outer loop link adaptation scheme may rely on CQI as an input for MCS selection, and the CQI in the outer loop scheme may be used also to adapt pilot structures. The base station 110 may use the information to change the pilot structure. In addition, the base station 110 may measure characteristics of the channel, such as Doppler spread, channel delay spread, interference measurements, and/or signal-to-noise-plus-interference ratios. In a time-division duplex (TDD) system, the uplink and downlink channels may exhibit reciprocal characteristics so measures of uplink channel quality may apply to downlink channel quality. The base station 110 may use uplink measurements to change downlink pilot structures.

Figure 5:
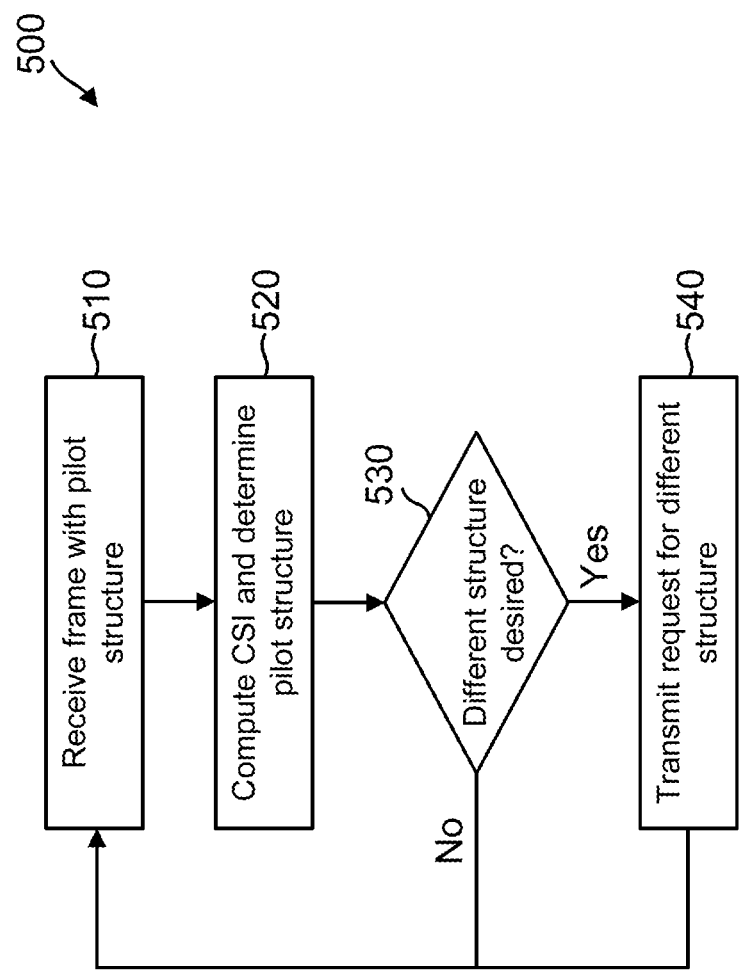
FIG. 5 is a flowchart illustrating an exemplary method for adapting pilot structures in accordance with various aspects of the present disclosure.

FIG. 5 is a flowchart illustrating an exemplary method 500 for adapting pilot structures. The method 500 may be implemented in a UE, such as UE 120. A UE communicates with a base station, such as base station 110, according to the method 500. The method may be implemented in the receiver system 250. Instructions or code may be stored in the memory 272 that are executable by the processor 270 in the receiver system 250 to implement the method 500.

The method begins in block 510. In block 510 at least one frame with at least one pilot structure is received and processed by a UE. In block 520 a pilot structure for a future transmission is determined based on CSI provided by the received pilot structure(s). The CSI may include any of a number of the parameters discussed earlier, such as Doppler spread and delay spread. The CSI may incorporate historical CSI data based on past frames, so the CSI may be based on more than just the most recently transmitted frame or frames. The processor 270 may be configured to compute CSI from the received pilots.

In decision block 530, a determination is made whether a pilot structure different from the received pilot structure(s) is desired for a future transmission. As discussed earlier, the determination may be based on any of a number of estimated parameters. In some embodiments, if a different pilot structure is not desired, the UE will remain silent and the serving base station may keep using the same pilot structure by default. If a different pilot structure is not desired, the method returns to block 510, and the same pilot structure is used as for the previous pilot structure.

If a different pilot structure is desired, a request for a different pilot structure is transmitted in block 540. The pilot structure may include a different number of pilot symbols that use a different number of resource elements than a previously received pilot structure. The different number of resource elements may be distributed over the same number of OFDM symbols or a different number of OFDM symbols. For example, the pilot structure illustrated in FIG. 3B uses a different number of resource elements for pilot symbols (twice as many resource elements in this example) as compared with the pilot structures in FIG. 3A. The resource elements used for pilot symbols in FIG. 3B are distributed over twice as many OFDM symbol positions as compared with FIG. 3A. For example, there are pilot symbols in four OFDM symbol positions (0, 1, 4, and 5) in the first TTI in FIG. 3B, whereas there are pilot symbols in two OFDM symbol positions (0 and 1) in the first TTI in FIG. 3A.

The pilot structure in FIG. 3C also uses a different number of resource elements for pilot symbols (twice as many) as compared to FIG. 3A. The resource elements used for pilot symbols in FIG. 3C are distributed over the same number of OFDM symbol positions as compared with FIG. 3A. For example, there are pilot symbols in two OFDM symbol positions (0 and 1) in the first TTI in FIG. 3C, and there are also pilot symbols in two OFDM symbol positions (0 and 1) in the first TTI in FIG. 3A. However, the density of pilot symbols versus frequency is increased within the same number of symbol positions.

Figure 6:
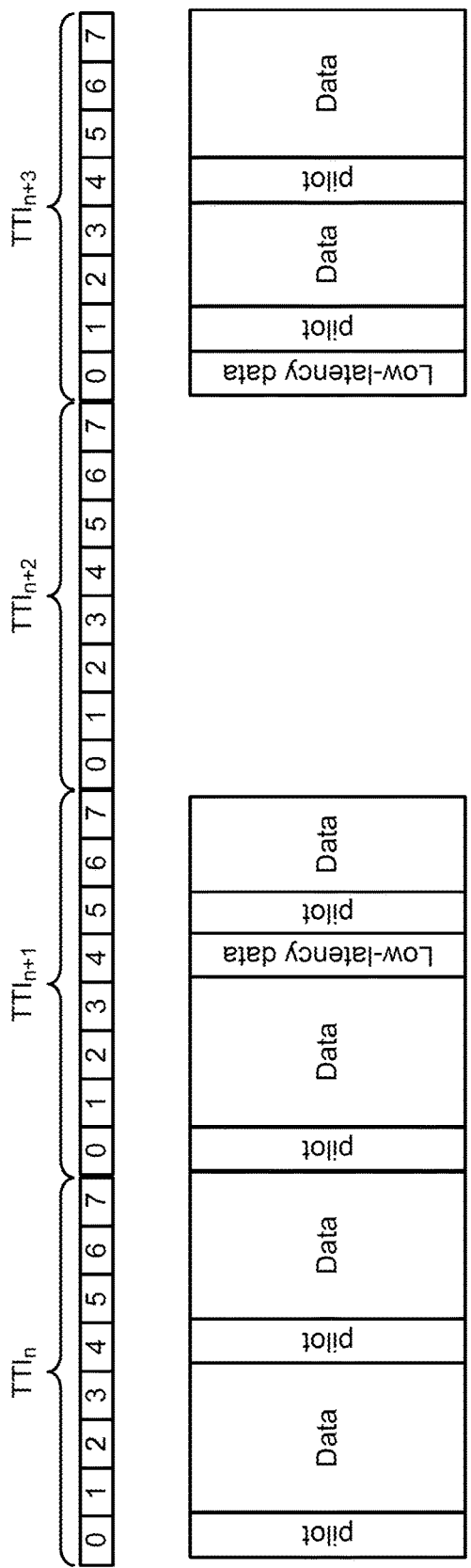
FIG. 6 illustrates an example frame structure to accommodate low-latency data in accordance with various aspects of the present disclosure.

FIG. 6 illustrates an example frame structure to accommodate as needed transmission of low-latency data. A frame may be transmitted in a TTI. The structure illustrated in $TTI_n$ represents an example baseline frame structure. The frames in FIG. 6 may be transmitted from a base station, such as base station 110, to a UE, such as UE 120 or vice versa. The symbols in FIG. 6 marked "data" may represent symbols transmitted as part of an on-going data session between a UE and a base station. The baseline frame structure in this example is one in which an OFDM symbol containing pilot symbols is transmitted in an alternating manner with data symbols. In $TTI_n$, an OFDM symbol containing pilot symbols (labeled as "pilot") is transmitted at symbol indexes 0 and 4.

In $TTI_{n+1}$, low-latency data is available. In effect, low-latency data "trumps" or supersedes any data scheduled to be transmitted as part of the on-going data session. The data in the on-going session is relatively delay tolerant compared to the "low-latency" data. As part of an example network protocol, there may be a separate control channel (illustrated in FIG. 7) that indicates to the UE that low-latency data is available. It is understood or implied that the next OFDM pilot will be punctured or moved from its standard position (in this case, OFDM symbol period 4 in $TTI_{n+1}$) to another OFDM symbol period (in this case, OFDM symbol period 5 in $TTI_{n+1}$). In general, the pilot may be moved any number of symbols periods later (e.g., two, three, etc. symbol periods later), as long as the UE is aware of the number of symbols that the pilot is moved.

Figure 7:
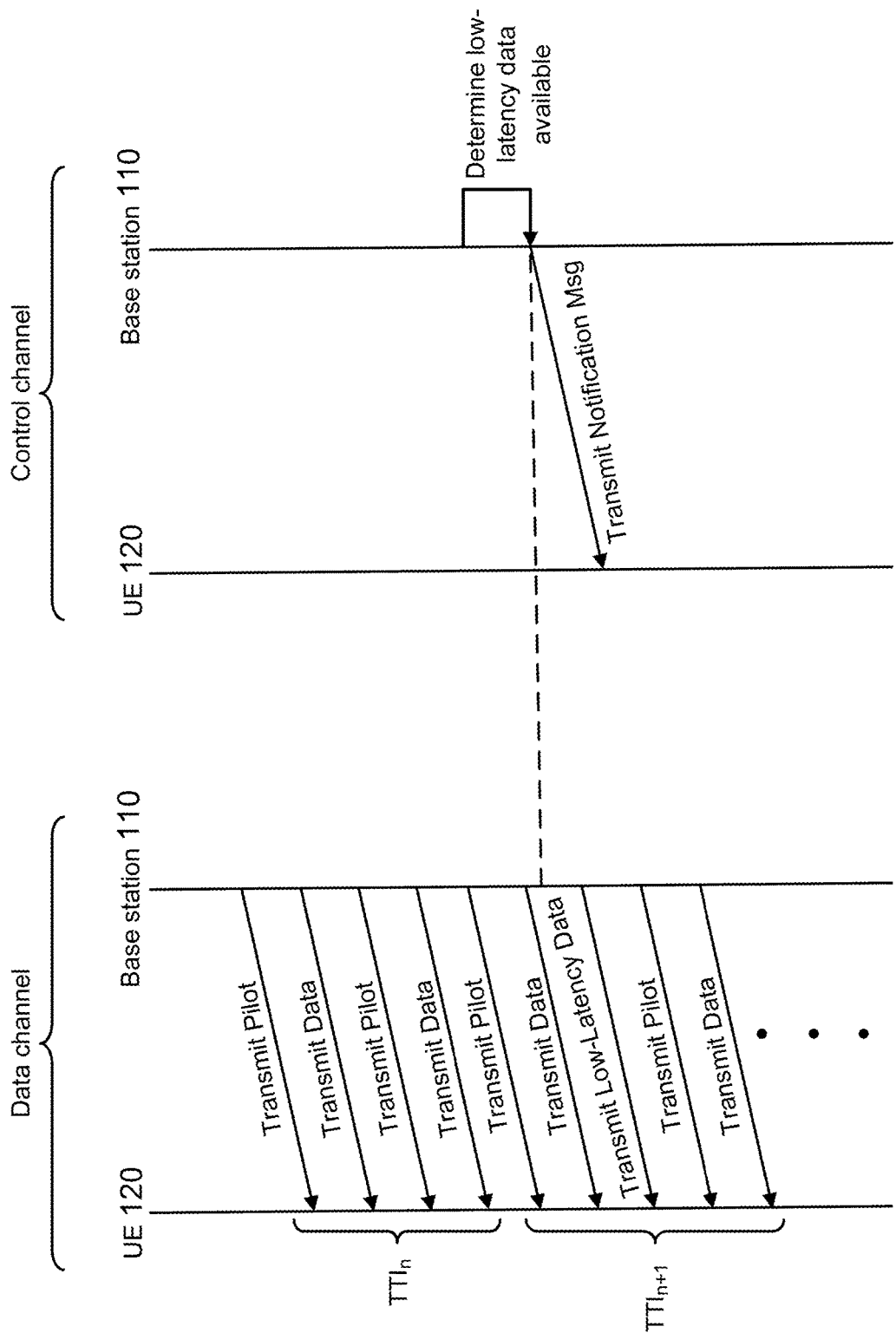
FIG. 7 is a protocol diagram that illustrates example transmissions in accordance with various aspects of the present disclosure.

FIG. 7 is a protocol diagram that illustrates example transmissions during the first two TTIs of FIG. 6 between a base station 110 and a UE 120. FIG. 7 illustrates a data channel that contains the transmissions of the first two TTIs of FIG. 6 as well as an associated control channel When low-latency data is available, a transmit notification message is transmitted over the control channel from the base station 110 to UE 120 as shown. The notification message is transmitted shortly after the base station 110 becomes aware of the low-latency data, due at least in part to the delay intolerance of the low-latency data.

Returning to FIG. 6, in this example there is no data to transmit during $TTI_{n+2}$, so there is no transmission. During $TTI_{n+2}$, the base station becomes aware that more low-latency data is available. The UE is informed of the low-latency data via a control channel as discussed earlier. The low-latency data supersedes the pilot for the following TTI, $TTI_{n+3}$, so the pilot is moved from OFDM symbol period 0 to OFDM period 1 to make room for the low-latency data. The process of transmitting frames during TTIs and inserting low-latency data as needed may continue indefinitely.

In some instances, severe bursty interference occurs during a downlink transmission. Bursty interference can include interference that occurs in short spurts or time intervals over a short period of time. Bursty interference may appear for only a brief period of time to affect some signals but may not appear over such a sustained period of time that the system should adapt to the level of interference as a long-term statistic. One example of bursty interference is a non-persistent burst data transmission that may occur nearby in another cell that becomes co-channel interference in the cell of interest. There may be a small amount of data (e.g., an email or small data file) to convey in a bursty data transmission.

Burst interference can be a source of interference to data transmissions. Burst interference may corrupt pilot structures as well as other parts of a transmitted signal. For short bursts of interference that can result in corrupted pilot structures, it may be beneficial to retransmit a pilot structure that is corrupted.

Figure 8:
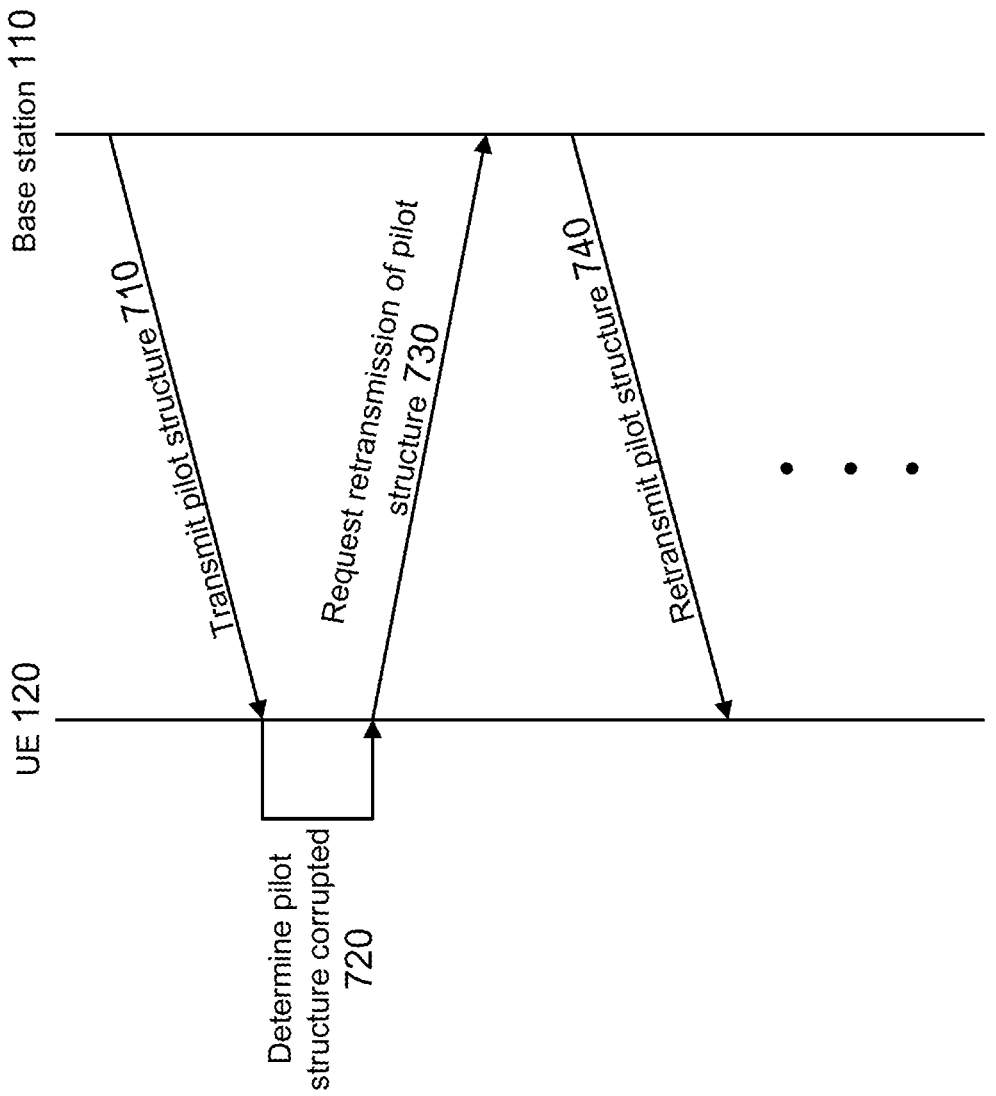
FIG. 8 is a protocol diagram that illustrates an example of retransmission of a pilot structure in accordance with various aspects of the present disclosure.

FIG. 8 is a protocol diagram that illustrates an example of retransmission of a pilot structure. In action 710, a pilot structure is transmitted from a base station 110 to a UE 120. The pilot structure may include any number of pilot symbols in any of the resource element of a frame or data block transmitted during a TTI. The pilot structures of FIGS. 3A-3C are examples. In action 720, the UE 120 determines that the pilot structure is corrupted. For example, this determination may be made in a processor, such as processor 270 in FIG. 2. For example, the UE 120 may determine that a pilot structure is corrupted based on estimates of interference or noise levels during reception of pilot symbols in the pilot structure. An estimate of interference may exceed a threshold, for example. The UE 120 may further compare estimates against long-term averages to determine whether the interference level is elevated for a short time. One skilled in the art will recognize that there are a variety of techniques to estimate interference level during a given time interval.

As a result of determining that a pilot structure is corrupted, in action 730 the UE formulates a request for retransmission of the pilot structure and transmits the request for retransmission to the base station 110. After receiving the request for retransmission, the base station 110 retransmits the pilot structure in action 740.

In an additional aspect of the disclosure, a method for wireless communication includes receiving a set of pilot symbols during a TTI, determining that the set of pilot symbols is corrupted, and in response to the determining, requesting a retransmission of the set of pilot symbols. In an embodiment, determining that the set of pilot symbols is corrupted includes measuring an interference level and determining that the interference level exceeds a threshold.

In an additional aspect of the disclosure, a method for wireless communication includes transmitting a set of pilot symbols during a TTI, receiving a measure of an interference level for the set of pilot symbols, determining that the measure exceeds a threshold, and in response to the determining, retransmitting the set of pilot symbols in one of the next several symbols.

In an additional aspect of the disclosure, a wireless communication apparatus includes a receiver configured to receive a first set of pilot symbols using a first number of resource elements during a first TTI, and receive a second set of pilot symbols using a second number of resource elements during a second TTI, wherein the first TTI and the second TTI comprise the same number of resource elements, and wherein the first number of resource elements is different than the second number of resource elements. In at least one embodiment, the wireless communication apparatus further includes a processor coupled to the receiver, wherein the processor is configured to measure a channel characteristic, and determine the second number of resource elements based on the channel characteristic, and a transmitter coupled to the processor, wherein the transmitter is configured to transmit a request comprising an indication of the second number of resource elements. In at least one embodiment, the first number of resource elements is distributed over a first number of OFDM symbols in the first TTI, and the second number of resource elements is distributed over a second number of OFDM symbols in the second TTI. Furthermore, in some cases, the first number of OFDM symbols is equal to the second number of OFDM symbols, and in other cases the first number of symbols is proportional to the first number of resource elements and the second number of symbols is proportional to the second number of resource elements.

In an additional aspect of the disclosure, a computer program product for wireless communications includes a non-transitory computer-readable medium having program code recorded thereon, the program code including code for causing a receiver to receive a first set of pilot symbols using a first number of resource elements during a first TTI, and code for causing the receiver to receive a second set of pilot symbols using a second number of resource elements during a second TTI, wherein the first TTI and the second TTI include the same number of resource elements, and wherein the first number of resource elements is different than the second number of resource elements. In at least one embodiment, the computer readable medium further includes code for causing the computer to measure a channel parameter, code for causing the computer to determine the second number of resource elements based on the channel characteristic, and code for causing the computer to transmit a request comprising an indication of the second number of resource elements. In at least one embodiment, the first number of resource elements is distributed over a first number of OFDM symbols in the first TTI, and the second number of resource elements is distributed over a second number of OFDM symbols in the second TTI. Furthermore, in some cases the first number of OFDM symbols is equal to the second number of OFDM symbols, and in other cases the first number of symbols is proportional to the first number of resource elements and the second number of symbols is proportional to the second number of resource elements.

In an additional aspect of the disclosure, a base station includes a processor configured to determine that low-latency data is available to transmit during a first TTI, a transmitter coupled to the processor and configured to inform a mobile station that the low-latency data will be transmitted during a first time slot reserved for a pilot symbol in the first TTI, transmit the low-latency data during the first time slot, and transmit the pilot symbol during a second time slot. In at least one embodiment, the processor is further configured to determine that low-latency data is not available to transmit during a second TTI, wherein the second TTI follows the first TTI, and wherein the transmitter is further configured to transmit a second pilot symbol during a time slot reserved for the second pilot symbol in the second TTI. In at least one embodiment, the second time slot is adjacent to the first time slot. A data symbol may have been previously scheduled for the second time slot.

In an additional aspect of the disclosure, an apparatus configured for wireless communication includes means for receiving a first set of pilot symbols using a first number of resource elements during a first TTI, and means for receiving a second set of pilot symbols using a second number of resource elements during a second TTI, wherein the first TTI and the second TTI include the same number of resource elements, and wherein the first number of resource elements is different than the second number of resource elements. In at least one embodiment, the apparatus further includes means for measuring a channel characteristic, means for determining the second number of resource elements based on the channel characteristic, and means for requesting the second number of resource elements. In at least one embodiment, the first number of resource elements is distributed over a first number of OFDM symbols in the first TTI, and the second number of resource elements is distributed over a second number of OFDM symbols in the second TTI. In some cases, the first number of OFDM symbols is equal to the second number of OFDM symbols, and in other cases, the first number of symbols is proportional to the first number of resource elements and the second number of symbols is proportional to the second number of resource elements.

The apparatus of the previous paragraph may further include means for forming an estimate of channel Doppler spread, means for forming an estimate of channel delay spread, means for determining the second number of resource elements based on the estimate of Doppler spread and the estimate of channel delay spread, and means for requesting the second number of resource elements. In at least one embodiment, the second number of resource elements is greater than the first number of resource elements if the estimate of channel delay spread exceeds a first threshold or the estimate of channel Doppler spread exceeds a second threshold. The channel characteristic may be Doppler spread, delay spread, or interference level.

The apparatuses of the previous two paragraphs may further include means for forming an estimate of Doppler spread, means for determining that the estimate exceeds a threshold, means for determining the second number of resource elements based on the estimate of Doppler spread, and means for requesting the second number of resource elements, wherein the first number of resource elements is a baseline number of resource elements, wherein the second number of resource elements is greater than the first number of resource elements, and wherein second number of resource elements is distributed over a greater number of time slots than the first number of resource elements. The apparatus may further include means for forming an estimate of channel delay spread, means for determining that the estimate exceeds a threshold, means for determining the second number of resource elements based on the estimate of channel delay spread, and means for requesting the second number of resource elements, wherein the first number of resource elements is a baseline number of resource elements, wherein the second number of resource elements is greater than the first number of resource elements, and wherein second number of resource elements is distributed over a same number of time slots as the first number of resource elements.

In an additional aspect of the disclosure, a wireless communication apparatus includes a receiver configured to receive a set of pilot symbols during a TTI, a processor coupled to the receiver and configured to determine that the set of pilot symbols is corrupted, and a transmitter coupled to the processor and configured to, in response to the determining, request a retransmission of the set of pilot symbols. In the apparatus, determining that the set of pilot symbols is corrupted may include determining an interference level and determining that the interference level exceeds a threshold.

In an additional aspect of the disclosure, a wireless communication apparatus includes a transmitter configured to transmit a set of pilot symbols during a TTI, a receiver configured to receive a measure of an interference level for the set of pilot symbols, a processor coupled to the receiver and configured to determine that the measure exceeds a threshold, wherein the transmitter is further configured to, in response to the determining, retransmit the set of pilot symbols in one of the next several symbols.

In an additional aspect of the disclosure, a UE includes a receiver configured to receive a scheduling message indicating that low-latency data is scheduled to be transmitted during a first time slot reserved for a pilot symbol in a first TTI, receive the low-latency data during the first time slot, and receive the pilot symbol during a second time slot. In at least one embodiment, the second time slot is adjacent to the first time slot. The data symbol may have been previously scheduled for the second time slot.

In an additional aspect of the disclosure, a computer readable medium having program code recorded thereon includes code for causing a computer to receive a set of pilot symbols during a TTI, code for causing the computer to determine that the set of pilot symbols is corrupted, and code for causing the computer to, in response to the determining, requesting a retransmission of the set of pilot symbols. In at least one embodiment, the code for causing the computer to determine that the set of pilot symbols is corrupted includes code for causing the computer to measure an interference level, and code for causing the computer to determine that the interference level exceeds a threshold.

In an additional aspect of the disclosure, a computer readable medium having program code recorded thereon includes code for causing a computer to transmit a set of pilot symbols during a TTI, code for causing the computer to receive a measure of an interference level for the set of pilot symbols, code for causing the computer to determine that the measure exceeds a threshold, and code for causing the computer to, in response to the determining, retransmit the set of pilot symbols in one of the next several symbols.

In an additional aspect of the disclosure, a computer readable medium having program code recorded thereon includes code for causing a computer to determine that low-latency data is available to transmit during a first TTI, code for causing the computer to inform a mobile station that the low-latency data will be transmitted during a first time slot reserved for a pilot symbol in the first TTI, code for causing the computer to transmit the low-latency data during the first time slot, and code for causing the computer to transmit the pilot symbol during a second time slot.

In at least one embodiment, the computer readable medium further includes code for causing the computer to determine that low-latency data is not available to transmit during a second TTI, wherein the second TTI follows the first TTI, and code for causing the computer to transmit a second pilot symbol during a time slot reserved for the second pilot symbol in the second TTI. In some circumstances, the second time slot is adjacent to the first time slot. The data symbol may have been previously scheduled for the second time slot.

In an additional aspect of the disclosure, a computer readable medium having program code recorded thereon includes code for causing a computer to receive a scheduling message indicating that low-latency data is scheduled to be transmitted during a first time slot reserved for a pilot symbol in a first TTI, code for causing the computer to receive the low-latency data during the first time slot, and code for causing the computer to receive the pilot symbol during a second time slot. In some circumstances, the second time slot is adjacent to the first time slot. Furthermore, a data symbol may have been previously scheduled for the second time slot. In some embodiments, the actions are performed by a UE.

In an additional aspect of the disclosure, a base station includes a transmitter configured to transmit a first set of pilot symbols using a first number of resource elements during a first TTI, and transmit a second set of pilot symbols using a second number of resource elements during a second TTI, wherein the first TTI and the second TTI comprise the same number of resource elements, and wherein the first number of resource elements is different than the second number of resource elements. In some embodiments, the base station further includes a receiver coupled to the transmitter and configured to receive a request comprising an indication of the second number of resource elements, wherein the second number of resource elements is based on a measured channel characteristic. Furthermore, the first number of resource elements is distributed over a first number of OFDM symbols in the first TTI, wherein the second number of resource elements is distributed over a second number of OFDM symbols in the second TTI, and wherein the first number of OFDM symbols is equal to the second number of OFDM symbols. In some instances, the first number of resource elements is distributed over a first number of symbols in the first TTI, wherein the second number of resource elements is distributed over a second number of symbols in the second TTI, wherein the first number of symbols is proportional to the first number of resource elements, and wherein the second number of symbols is proportional to the second number of resource elements. In some embodiments, the base station further includes a receiver configured to receive a signal from a mobile station, a processor coupled to the receiver and configured to determine a channel characteristic based on the signal, and determine the second number of resource elements based on the channel characteristic. The channel characteristic may include Doppler spread, delay spread, or interference level. In some embodiments, the processor is further configured to select a downlink MCS, and determine the second number of resource elements based on the downlink MCS. In some embodiments, the processor is further configured to perform an outer loop link adaptation using values of a CQI, and determine the second number of resource elements based on the values of the CQI.

In an additional aspect of the disclosure, a computer readable medium has program code recorded thereon, and the program code includes code for causing a computer to transmit a first set of pilot symbols using a first number of resource elements during a TTI, and code for causing the computer to transmit a second set of pilot symbols using a second number of resource elements during a second TTI, wherein the first TTI and the second TTI comprise the same number of resource elements, and wherein the first number of resource elements is different than the second number of resource elements. The program code may further include code for causing the computer to receive a request comprising an indication of the second number of resource elements, wherein the second number of resource elements is based on a measured channel characteristic. In some embodiments, the first number of resource elements is distributed over a first number of OFDM symbols in the first TTI, and wherein the second number of resource elements is distributed over a second number of OFDM symbols in the second TTI. The first number of OFDM symbols may be equal to the second number of OFDM symbols, or first number of symbols may be proportional to the first number of resource elements and the second number of symbols may be proportional to the second number of resource elements. In some embodiments, the computer readable medium further includes code for causing the computer to receive a signal from a mobile station, code for causing the computer to determine a channel characteristic based on the signal, and code for causing the computer to determine the second number of resource elements based on the channel characteristic. The channel characteristic may include Doppler spread, delay spread, or interference level. In some embodiments, the computer readable medium may further include code for causing the computer to select a downlink MCS at the base station, and code for causing the computer to determine the second number of resource elements based on the downlink MCS. In some embodiments, the computer readable medium may further include code for causing the computer to perform an outer loop link adaptation using values of a CQI, and code for causing the computer to determine the second number of resource elements based on the values of the CQI.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, " or " as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:
1. A method for wireless communication, comprising:
   determining that low-latency data is available to transmit during a first transmission time interval (TTI);
   informing a mobile station that the low-latency data will be transmitted during a first time slot reserved for a pilot symbol in the first TTI;
   transmitting the low-latency data during the first time slot; and
   transmitting the pilot symbol during a second time slot.

2. The method of claim 1, further comprising:
   determining that low-latency data is not available to transmit during a second TTI, wherein the second TTI follows the first TTI; and
   transmitting a second pilot symbol during a time slot reserved for the second pilot symbol in the second TTI.

3. The method of claim 1, wherein the second time slot is adjacent to the first time slot.

4. The method of claim 1, wherein a data symbol was previously scheduled for the second time slot.

5. The method of claim 4, wherein the low-latency data has a higher priority than the data symbol previously scheduled for the second time slot.

6. The method of claim 5, wherein the steps are performed by a base station.

7. A method for wireless communication, comprising:
   receiving a scheduling message indicating that low-latency data is scheduled to be transmitted during a first time slot reserved for a pilot symbol in a first transmission time interval (TTI);
   receiving the low-latency data during the first time slot; and
   receiving the pilot symbol during a second time slot.

8. The method of claim 7, wherein the second time slot is adjacent to the first time slot.

9. The method of claim 7, wherein a data symbol was previously scheduled for the second time slot.

10. The method of claim 7, wherein the steps are performed by a user equipment (UE).

11. An apparatus, comprising:
    a processor configured to:
      determine that low-latency data is available to transmit during a first transmission time interval (TTI);
      inform a mobile station that the low-latency data will be transmitted during a first time slot reserved for a pilot symbol in the first TTI; and
    a transceiver configured to:
      transmit the low-latency data during the first time slot; and
      transmit the pilot symbol during a second time slot.

12. The apparatus of claim 11, wherein the processor is further configured to determine that low-latency data is not available to transmit during a second TTI, wherein the second TTI follows the first TTI, and wherein the transceiver is further configured to transmit a second pilot symbol during a time slot reserved for the second pilot symbol in the second TTI.

13. The apparatus of claim 11, wherein the second time slot is adjacent to the first time slot.

14. The apparatus of claim 11, wherein a data symbol was previously scheduled for the second time slot.

15. The apparatus of claim 14, wherein the low-latency data has a higher priority than the data symbol previously scheduled for the second time slot.

16. The apparatus of claim 15, wherein the apparatus is a base station.

17. An apparatus comprising:
    a transceiver configured to:
      receive a scheduling message indicating that low-latency data is scheduled to be transmitted during a first time slot reserved for a pilot symbol in a first transmission time interval (TTI);
      receive the low-latency data during the first time slot; and
      receive the pilot symbol during a second time slot.

18. The apparatus of claim 17, wherein the second time slot is adjacent to the first time slot.

19. The apparatus of claim 17, wherein a data symbol was previously scheduled for the second time slot.

20. The apparatus of claim 17, wherein the apparatus is a user equipment (UE).

* * * * *